(12) United States Patent
Kohno et al.

(10) Patent No.: US 9,489,523 B2
(45) Date of Patent: Nov. 8, 2016

(54) SYSTEMS AND METHODS FOR FILE ACCESS AUDITING

(75) Inventors: Tadayoshi Kohno, Seattle, WA (US); Roxana Geambasu, New York, NY (US); Henry Levy, Seattle, WA (US); Steven Gribble, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 46 days.

(21) Appl. No.: 13/640,034

(22) PCT Filed: Apr. 8, 2011

(86) PCT No.: PCT/US2011/031837
§ 371 (c)(1),
(2), (4) Date: Jan. 16, 2013

(87) PCT Pub. No.: WO2011/127440
PCT Pub. Date: Oct. 13, 2011

(65) Prior Publication Data
US 2013/0198522 A1 Aug. 1, 2013

Related U.S. Application Data

(60) Provisional application No. 61/322,202, filed on Apr. 8, 2010.

(51) Int. Cl.
G06F 21/00 (2013.01)
G06F 21/62 (2013.01)
G06F 21/88 (2013.01)

(52) U.S. Cl.
CPC ............... *G06F 21/62* (2013.01); *G06F 21/88* (2013.01); *G06F 2221/2101* (2013.01)

(58) Field of Classification Search
CPC ................. G06F 21/62; G06F 21/6209
USPC ............... 713/182, 193; 726/26–27
See application file for complete search history.

(56) References Cited

U.S. PATENT DOCUMENTS 6,212,280 B1    4/2001  Howard, Jr. et al.
6,249,866 B1 *  6/2001  Brundrett ............ G06F 12/1408
                                                380/286

(Continued)

OTHER PUBLICATIONS

International Search Report and Written Opinion mailed Dec. 26, 2011, issued in corresponding International Application No. PCT/US2011/031837, filed Apr. 8, 2011, 7 pages.

(Continued)

*Primary Examiner* — Christopher Revak
*Assistant Examiner* — Vadim Savenkov
(74) *Attorney, Agent, or Firm* — Christensen O'Connor Johnson Kindness PLLC

(57) ABSTRACT

Systems and methods for providing an auditing file system for theft-prone devices are disclosed. The auditing file system supports fine-grained file auditing: a user may obtain reliable, explicit evidence that no files have been accessed after a device's loss. A user may also disable future file access after a device's loss, even in the absence of device network connectivity. In one embodiment, files are encrypted locally but the encryption keys are stored remotely, so that an audit server is queried for encryption keys to access protected files. By configuring the audit server to refuse to return a particular file's key, the user can prevent new accesses after the device is lost.

22 Claims, 11 Drawing Sheets

(56) References Cited

U.S. PATENT DOCUMENTS

| | | | |
|---|---|---|---|
| 6,385,641 B1* | 5/2002 | Jiang et al. | 709/203 |
| 7,010,689 B1* | 3/2006 | Matyas et al. | 713/168 |
| 7,913,311 B2* | 3/2011 | Alain et al. | 726/28 |
| 7,930,757 B2* | 4/2011 | Shapiro et al. | 726/27 |
| 8,291,471 B2* | 10/2012 | Piccinini et al. | 726/2 |
| 2002/0097879 A1 | 7/2002 | Hasegawa | |
| 2005/0223242 A1* | 10/2005 | Nath | 713/193 |
| 2006/0048224 A1* | 3/2006 | Duncan | G06F 21/6218 726/22 |
| 2007/0050362 A1 | 3/2007 | Low | |
| 2007/0192580 A1* | 8/2007 | Challener et al. | 713/182 |
| 2007/0271592 A1* | 11/2007 | Noda et al. | 726/1 |
| 2007/0288768 A1 | 12/2007 | Nesta | |
| 2007/0297610 A1 | 12/2007 | Chen | |
| 2008/0233919 A1 | 9/2008 | Kenney | |
| 2008/0301445 A1 | 12/2008 | Vasic et al. | |
| 2009/0323972 A1 | 12/2009 | Kohno | |
| 2010/0031299 A1* | 2/2010 | Harrang et al. | 725/80 |
| 2010/0303240 A1 | 12/2010 | Beachem et al. | |
| 2011/0010761 A1 | 1/2011 | Doyle | |
| 2015/0199414 A1* | 7/2015 | Braginsky | G06F 17/30132 707/613 |

OTHER PUBLICATIONS

Anderson, R., and M. Kuhn, "Tamper Resistance: A Cautionary Note," The Second USENIX Workshop on Electronic Commerce Proceedings (WOEC '96), Oakland, Calif., Nov. 18-21, 1996, pp. 1-11.

Bellare, M., and C. Namprempre, "Authenticated Encryption: Relations Among Notions and Analysis of the Generic Composition Paradigm," in T. Okamoto (ed.), "Advances in Cryptology—ASIACRYPT 2000," Lecture Notes in Computer Science, vol. 1976, Springer-Verlag, Berlin, pp. 531-545.

Bellare, M., et al., "A Concrete Security Treatment of Symmetric Encryption," Proceedings of the 38th Annual Symposium on Foundations of Computer Science, Miami Beach, Fla., Oct. 20-22, 1997, pp. 394-403.

Bellare, M., et al., "The Security of Cipher Block Chaining," in Y.G. Desmedt (ed.), "Advances in Cryptology—CRYPTO '94," Lecture Notes in Computer Science, vol. 839, Springer-Verlag, Berlin, 1994, pp. 341-358.

Blaze, M., "A Cryptographic File System for UNIX," Proceedings of the 1st ACM Conference on Computer and Communications Security (CCS '93), Fairfax, Va., Nov. 3-5, 1993, pp. 9-16.

Boneh, D., and M. Franklin, "Identity-Based Encryption From the Weil Pairing," in J. Kilian (ed.), Proceedings of the 21st Annual International Cryptology Conference on Advances in Cryptology (CRYPTO 2001), Santa Barbara, Calif., Aug. 19-23, 2001, Lecture Notes in Computer Science, vol. 2139, Springer-Verlag, Berlin, 2001, pp. 213-229.

Boneh, D., and R. Lipton, "A Revocable Backup System," Proceedings of the Sixth USENIX UNIX Security Symposium (SSYM '96), San Jose, Calif., Jul. 22-25, 1996, pp. 1-7.

Boneh, D., et al., "Stanford IBE Secure Email: Source Code," <http://crypto.stanford.edu/ibe/download.html> [retrieved Mar. 18, 2015], 2 pages.

"Consumer Password Worst Practices: The Imperva Application Defense Center (ADC)," Imperva White Paper, 2010, <http://www.imperva.com/docs/WP_Consumer_Password_Worst_Practices.pdf> [retrieved Aug. 18, 2016], 5 pages.

Corner, M.D., and B.D. Noble, "Protecting Applications With Transient Authentication," Proceedings of MobiSys 2003: The First International Conference on Mobile Systems, Applications, and Services, San Francisco, May 5-8, 2003, pp. 57-70.

Corner, M.D., and B.D. Noble, "Zero-Interaction Authentication," Proceedings of the 8th Annual International Conference on Mobile Computing and Networking (MobiCom '02), Atlanta, Sep. 23-28, 2002, pp. 1-11.

Fu, K., et al., "Fast and Secure Distributed Read-Only File System," ACM Transactions on Computer Systems (TOCS) 20(1):1-24, Feb. 2002.

"FUSE: Filesystem in Userspace," Nov. 17, 2004, <https://web.archive.org/web/20041117025746/http://fuse.sourceforge.net/> [retrieved Mar. 20, 2015], 3 pages.

Geambasu, R., et al., "Keypad: An Auditing File System for Theft-Prone Devices," Proceedings of the Sixth Conference on Computer Systems (EuroSys '11), Salzburg, Austria, Apr. 10-13, 2011, pp. 1-15.

Geambasu, R., et al., "Vanish: Increasing Data Privacy With Self-Destructing Data," Proceedings of the 18th Conference on USENIX Security Symposium (SSYM '09), Montreal, Aug. 10-14, 2009, pp. 299-350.

Goldreich, O., et al., "On the Cryptographic Applications of Random Functions," in G.R. Blakley and D. Chaum (eds.), "Advances in Cryptology—CRYPTO '84," Lecture Notes in Computer Science, vol. 196, Springer-Verlag, Berlin, 1985, pp. 276-288.

Gough, V., "EncFS Encrypted Filesystem," May 20, 2007, <https://web.archive.org/web/20070630211124/http://arg0.net/encfs#about> [retrieved Mar. 20, 2015], 3 pages.

Halderman, J.A., et al., "Lest We Remember: Cold Boot Attacks on Encryption Keys," Proceedings of the 17th USENIX Security Symposium (SS '08), San Jose, Calif., Jul. 28-Aug. 1, 2008, pp. 45-60.

Howard, J.H., et al., "Scale and Performance in a Distributed File System," ACM Transactions on Computer Systems (TOCS) 6(1):51-81, Feb. 1988.

Kistler, J.J., and M. Satyanarayanan, "Disconnected Operation in the Coda File System," Proceedings of the 13th ACM Symposium on Operating System Principles (SOSP '91), Pacific Grove, Calif., Oct. 13-16, 1991, pp. 213-225.

Lee, E.K., and C.A. Thekkath, "Petal: Distributed Virtual Disks," Proceedings of the Seventh International Conference on Architectural Support for Programming Languages and Operating Systems (ASPLOS '96), Cambridge, Mass., Oct. 1-5, 1996, pp. 84-92.

MacKenzie, P., and M.K. Reiter, "Delegation of Cryptographic Servers for Capture-Resilient Devices," Proceedings of the Eighth ACM Conference on Computer and Communications Security (CCS '01), Philadelphia, Nov. 5-8, 2001, pp. 10-19.

Mazières, D., et al., "Separating Key Management From File System Security," Proceedings of the 17th ACM Symposium on Operating Systems Principles (SOSP '99), Kiawah Island, S.C., Dec. 12-15, 1999, pp. 124-139.

Mummert, L.B., et al., "Exploiting Weak Connectivity for Mobile File Access," Proceedings of the 15th ACM Symposium on Operating Systems Principles (SOSP '95), Copper Mountain, Colo., Dec. 3-6, 1995, pp. 143-155.

Muthitacharoen, A., et al., "A Low-Bandwidth Network File System," Proceedings of the 18th ACM Symposium on Operating Systems Principles (SOSP '01), Banff, Alberta, Canada, Oct. 21-24, 2001, pp. 174-187.

Nusca, A., "How To: Keep Your Laptop From Being Stolen," ZDNet, Feb. 26, 2009, <http://www.zdnet.com/article/how-to-keep-your-laptop-from-being-stolen/> [retrieved Mar. 20, 2015], 3 pages.

Perlman, R., "File System Design With Assured Delete," Proceedings of the Third IEEE International Security in Storage Workshop (SISW '05), San Francisco, Dec. 13, 2005, 7 pages.

Peterson, K., et al., "Flexible Update Propagation for Weakly Consistent Replication," Proceedings of the 16th ACM Symposium on Operating Systems Principles (SOSP '97), Saint-Malo, France, Oct. 5-8, 1997, pp. 288-301.

Ponemon, L., "Airport Insecurity: The Case of Lost & Missing Laptops, Executive Summary, U.S. & EMEA Results," Ponemon Institute LLC, Jul. 29, 2008, <http://www.ponemon.org/data-security> [retrieved Aug. 18, 2016], 19 pages.

Provos, N., "Encrypting Virtual Memory," Proceedings of the 9th USENIX Security Symposium, Denver, Colo., Aug. 14-17, 2000, 11 pages.

Ristenpart, T., et al., "Privacy-Preserving Location Tracking of Lost or Stolen Devices: Cryptographic Techniques and Replacing

(56) References Cited

OTHER PUBLICATIONS

Trusted Third Parties With DHTs," Proceedings of the 17th USENIX Security Symposium, San Jose, Calif., Jul. 28-Aug. 1, 2008, pp. 275-290.

Robertson, J., "Security Chip That Does Encryption in PCs Hacked," USAToday.com, Feb. 8, 2010, <http://usatoday30.usatoday.com/tech/news/computersecurity/2010-02-08-security-chip-pc-hacked_n.htm> [retrieved Mar. 20, 2015], 2 pages.

Rogaway, P., et al., "OCB: A Block-Cipher Mode of Operation for Efficient Authenticated Encryption," Proceedings of the Eighth Conference on Computer and Communications Security (CCS '01), Philadelphia, Nov. 5-8, 2001, pp. 196-205.

Rutkowska, J., "Evil Maid Goes After TrueCrypt!" The Invisible Things Lab's Blog, Oct. 16, 2009, <http://theinvisiblethings.blogspot.com/2009/10/evil-maid-goes-after-truecrypt.html> [retrieved Mar. 20, 2015], 17 pages.

Sandberg, R., et al., "Design and Implementation of the Sun Network Filesystem," Proceedings of the USENIX Annual Technical Conference & Exhibition, Portland, Oregon, Summer 1985, pp. 119-130.

Savage, M., "NHS 'Loses' Thousands of Medical Records," The Independent, May 25, 2009, <http://www.independent.co.uk/news/uk/politics/nhs-loses-thousands-of-medical-records-1690398.html> [retrieved Mar. 20, 2015], 6 pages.

Shamir, A., "Identity-Based Cryptosystems and Signature Schemes," Proceedings of the Fifth Annual International Cryptology Conference on Advances in Cryptology (CRYPTO '84), in G.R. Blakley and D. Chaum (eds.), "Advances in Cryptology 1981-1997," Springer-Verlag, Berlin, pp. 47-53, 1985.

Sorrel, C., "Brits Send 4,500 USB Sticks to the Cleaners," Wired.com, Jan. 21, 2010, <http://www.wired.com/2010/01/brits-send-4500-usb-sticks-to-the-cleaners/> [retrieved Mar. 20, 2015], 3 pages.

Studer, A., and A. Perrig, "Mobile User Location-Specific Encryption (MULE): Using Your Office as Your Password," Proceedings of the Third ACM Conference on Wireless Network Security (WiSec '10), Hoboken, N.J., Mar. 22-24, 2010, pp. 151-162.

Whitten, A., and J.D. Tygar, "Why Johnny Can't Encrypt: A Usability Evaluation of PGP 5.0," Proceedings of the 8th USENIX Security Symposium, Washington, D.C., Aug. 23-26, 1999, 16 pages.

\* cited by examiner

Without IBE

With IBE

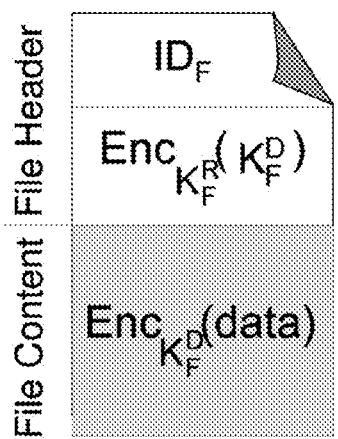 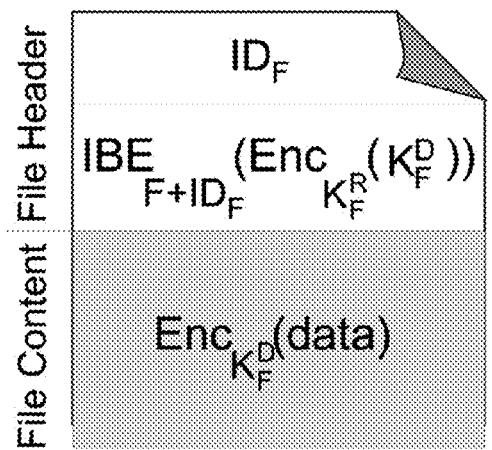
Protected File            IBE-Locked File.
*Fig. 5A.*            *Fig. 5B.*

Effect of IBE.

Effect of Device Pairing.

| Application | Task | EncFS | LAN (RTT=0.1ms) | | WLAN (RTT=2ms) | | Broadband (RTT=25ms) | | DSL (RTT=125ms) | | 3G (RTT=300ms) | |
|---|---|---|---|---|---|---|---|---|---|---|---|---|
| OpenOffice Word Processor | Launch | 0.5 | 0.5 | 0.5 | 0.6 | 0.6 | 1.3 | 1.3 | 2.7 | 2.7 | 4.6 | 4.6 |
| | New document | 0.0 | 0.0 | 0.0 | 0.0 | 0.0 | 0.0 | 0.0 | 0.0 | 0.1 | 0.0 | 0.3 |
| | Save as | 1.4 | 1.4 | 1.4 | 1.4 | 1.4 | 1.5 | 1.5 | 1.6 | 1.8 | 2.0 | 2.3 |
| | Open | 1.7 | 1.7 | 1.7 | 1.8 | 1.8 | 2.0 | 2.2 | 2.1 | 4.0 | 2.1 | 7.5 |
| | Quit | 0.1 | 0.1 | 0.1 | 0.1 | 0.1 | 0.3 | 0.4 | 0.4 | 0.7 | 0.4 | 1.2 |
| Firefox | Launch | 3.7 | 3.7 | 3.7 | 3.8 | 3.8 | 4.4 | 4.4 | 6.0 | 6.0 | 8.8 | 8.8 |
| | Save a page | 0.7 | 0.7 | 0.7 | 0.7 | 0.7 | 0.7 | 0.8 | 0.9 | 1.5 | 1.3 | 2.8 |
| | Load bookmark | 4.5 | 4.5 | 4.5 | 4.5 | 4.5 | 4.5 | 4.6 | 4.5 | 5.0 | 4.5 | 5.7 |
| | Open tab | 0.2 | 0.2 | 0.2 | 0.2 | 0.2 | 0.2 | 0.2 | 0.2 | 0.4 | 0.2 | 0.8 |
| | Close tab | 0.0 | 0.0 | 0.0 | 0.0 | 0.0 | 0.0 | 0.0 | 0.0 | 0.1 | 0.0 | 0.3 |
| Thunderbird | Launch | 1.3 | 1.3 | 1.3 | 1.3 | 1.3 | 1.4 | 1.4 | 2.0 | 2.0 | 3.1 | 3.1 |
| | Read email | 0.3 | 0.4 | 0.4 | 0.4 | 0.4 | 0.5 | 0.6 | 1.0 | 1.5 | 1.9 | 2.5 |
| | Quit | 0.2 | 0.2 | 0.2 | 0.2 | 2.2 | 0.2 | 0.4 | 0.2 | 1.3 | 0.2 | 2.9 |
| Evince PDF Viewer | Launch | 0.1 | 0.1 | 0.1 | 0.1 | 0.1 | 0.1 | 0.1 | 0.1 | 0.1 | 0.1 | 0.4 |
| | Open document | 0.1 | 0.1 | 0.1 | 0.1 | 0.1 | 0.1 | 0.1 | 0.2 | 0.2 | 0.4 | 0.4 |
| | Quit | 0.0 | 0.0 | 0.0 | 0.0 | 0.0 | 0.0 | 0.0 | 0.0 | 0.0 | 0.0 | 0.0 |

Time (seconds)

x | y:  x = time with warm key cache
     y = time with cold key cache

*Fig. 9B.*

SYSTEMS AND METHODS FOR FILE ACCESS AUDITING

CROSS-REFERENCE TO RELATED APPLICATION

This application claims the benefit of U.S. Provisional Application No. 61/322,202, filed Apr. 8, 2010, which is hereby incorporated by reference herein in its entirety for all purposes.

STATEMENT OF GOVERNMENT LICENSE RIGHTS

This invention was made with Government support under grant numbers CNS-0614975 and CNS-0430477 awarded by the NSF. The Government has certain rights in the invention.

BACKGROUND

Laptops, USB flash memory sticks, and other mobile computing devices greatly facilitate on-the-go productivity and the transport, storage, sharing, and mobile use of information. Unfortunately, their mobile nature and small form factors also make them highly susceptible to loss or theft. As example statistics, one in ten laptops is lost or stolen within a year of purchase, 600,000 laptops are lost annually in U.S. airports alone, and dry cleaners in the U.K. found over 4,000 USB sticks in pockets in 2009. The loss of such devices is most concerning for organizations and individuals storing confidential information, such as medical records, social security numbers (SSNs), and banking information.

Conventional wisdom suggests that standard encryption systems, such as BitLocke™ from Microsoft®, PGP® Whole Disk Encryption from Symantee™ and TrueCrypt from the TrueCrypt Foundation, can protect confidential information. Unfortunately, encryption alone is sometimes insufficient to meet users' needs, for at least two reasons. Firstly, traditional encryption systems can and do fail in the world of real users. As described in the seminal paper "Why Johnny Can't Encrypt", security and usability are often at odds. Users find it difficult to create, remember, and manage passphrases or keys. As an example, a password-protected USB stick containing private medical information about prison inmates was lost along with a sticky note revealing its password. Encrypted file systems often rely on a locally stored key that is protected by a user's passphrase. User passphrases are known to be insecure; a recent study of consumer Web passwords found the most common one to be "123456". Finally, in the hands of a motivated data thief, devices are open to physical attacks on memory or cold-boot attacks to retrieve passphrases or keys. Even physical attacks on trusted platform modules (TPMs) and "tamper-resistant" hardware are possible.

Secondly, when encryption fails, it fails silently; that is, an unauthorized user might circumvent the encryption without the data owner ever learning of the access. The use of conventional encryption can therefore lead mobile device owners into a false sense of protection. For example, a hospital losing a laptop with encrypted patient information might not notify patients of its loss, even if the party finding the device has circumvented the encryption and accessed that information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a computer-implemented method for forcing file access auditing is provided. The method comprises receiving, by an auditing file system executing on a processor associated with a protected computing device, a request to access a protected file. A file key is received from a remote file access auditing server that allows access to data within the protected file. Access to data within the protected file is provided in response to the request by using the file key.

In another embodiment, a computer-implemented method for auditing access requests is provided. A request for a key associated with a protected resource is received by an access auditing server from a requesting device via a network. A record of the request is stored in a key access log, and the key is transmitted to the requesting device.

In yet another embodiment, a computer-implemetned method for auditing file access requests is provided. A request for a file key associated with a protected file is received by a paired device from a protected device. A request for the file key is transmitted by the paired device to a remote file access auditing server. A file key received from the remote file access auditing server is transmitted to the protected device.

In still another embodiment, a computer-implemented method for associating metadata with file access request audit logs is provided. The method comprises registering a file with an auditing file system, wherein the file is associated with metadata. Registering the file includes allocating, by a client device, an audit ID for the file, and transmitting the audit ID and the metadata to a remote metadata access auditing server.

In another embodiment, a computer-implemented method for auditing file accesses is provided. An audit ID for a file is allocated by a client device. The audit ID is transmitted to a remote file access auditing server. A file key is received from the remote file access auditing server, and contents of the file are protected using the file key.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5A illustrates one embodiment of information stored within a protected file according to various aspects of the present disclosure;

FIG. 5B illustrates one embodiment of information stored within a protected file that is protected using identity-based cryptography, according to various aspects of the present disclosure;

FIG. 9B is a table that illustrates a result of benchmark testing performed on an exemplary embodiment of the present disclosure with both a warm key cache and a cold key cache.

DETAILED DESCRIPTION

I. Introduction

Figure 1:
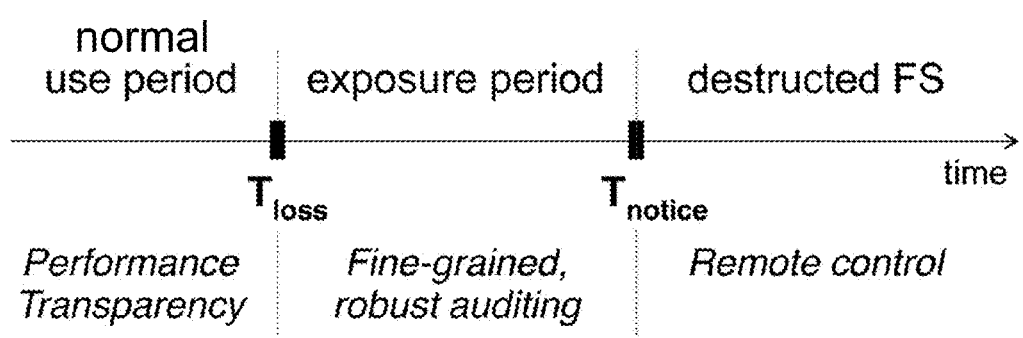
FIG. 1 illustrates a timeline in a typical lifetime of a client device, according to various aspects of the present disclosure.

The present disclosure describes auditing file systems and methods appropriate for loss- and theft-prone mobile devices. One goal of the auditing file systems and methods is to provide explicit evidence that protected data in a lost device either has or has not been exposed after loss. Specifically, someone who obtains a lost or stolen device using the auditing file systems of the present disclosure should not be able to read or write data within protected files on the device without triggering the creation of access log entries on a file access auditing server. This property holds even if the person finding the device also finds a note with the device's encryption password.

In one embodiment of the present disclosure, forensic logs stored by the file access auditing server are fine grained to allow detailed analysis of what data has been accessed. For example, a curious individual who finds a laptop at a coffee shop and seeks to learn its owner might register audit records for files in the home directory, but not for unaccessed confidential medical records also stored on the device. As another example, a professional data thief may attempt to access all of the specific confidential medical files stored on the device, and will register accesses to each file that they view.

Various embodiments of the auditing file systems also enable a device owner to disable access to files on a mobile device once the device owner realizes that the device has been lost or stolen, even if the device has no network connectivity or processing capability, such as a USB flash memory device.

Embodiments of the auditing file system described herein tightly entangle the process of file access with logging on a file access auditing server. To do this, embodiments of the auditing file system protect files using file-specific keys stored on a server. As automatically managed keys are used instead of passwords, users are not given the opportunity to choose weak passwords or accidentally reveal them. moreover, it is computationally infeasible for an attacker to access a file without leaving evidence in the access auditing log by requesting a corresponding key. When a file operation is invoked and a key request is sent, the auditing file system logs the file operation remotely, temporarily downloads the key to access the file, and securely erases the key shortly thereafter.

In one embodiment, the auditing file system is implemented on top of a traditional encrypted file system. The auditing file system provides a robust forensic trail for accessed files even if users choose weak passwords for the underlying encrypted file system, or if the traditional encrypted file system's keys are otherwise compromised.

While conceptually simple, the tension between providing adequate performance and reliable forensic recordkeeping is pervasive. As an example, consider the creation of a file. For forensic purposes, a naïve embodiment of the system might first pre-register newly created files and their corresponding keys with the remote server prior to writing any new data to those files. However, pre-registration would incur at least one full network round-trip, which could be problematic for some workloads over slow mobile networks, such as 3G or 4G. Delaying the registration is an obvious optimization, yet doing so may leave a loophole that an unauthorized user could exploit to access files without triggering a log entry in the remote server. In some embodiments of the auditing file system, optimizations are present that help provide an acceptable balance between performance and reliability.

Embodiments of the present disclosure are designed to increase assurances offered to owners of lost or stolen data storage devices. A typical device might have computational capabilities (e.g., laptops, smart phones, and the like) or might be simple storage devices (e.g., USB flash memory device, removable media, and the like). Embodiments of the present disclosure may be particularly valuable to users storing personal or corporate documents, banking information, SSNs, medical records, or other highly sensitive data on such devices.

A nonlimiting example of a situation in which using an embodiment of the present disclosure would be beneficial will now be briefly described. Alice is a businesswoman who carries a corporate laptop that stores documents containing trade secrets. Alice's IT department installs an embodiment of an auditing file system on the laptop, configuring the auditing file system to track accesses to files in her "corporate documents" folder. After returning to her hotel from a two-hour dinner, Alice notices that her laptop is missing. She immediately reports the loss to her IT department, which disables any future access to files in the corporate documents folder via a file access auditing server. The IT department also produces an audit log from records stored by the file access auditing server of all files accessed within the two-hour window since she last controlled her laptop. This audit log can confirm whether or not any protected files were accessed.

As a second nonlimiting example, at tax preparation time, Bob scans all of his tax documents, places them on a USB flash drive, encrypts it with a password, and physically hands the stick and password to his accountant. A few weeks later, Bob can no longer find his USB flash drive and can't remember whether his accountant kept it or whether he lost it in the intervening weeks. Fortunately, Bob's stick was protected with the auditing file system and Bob uses a Web service provided by his drive manufacturer to view an audit log of all accesses to the drive. He sees that there were many accesses to his tax files over the previous week and he learns the IP addresses from which those accesses were made. Bob therefore places fraud alerts on his financial accounts and notifies the appropriate authorities.

In these scenarios, Alice and Bob benefit from additional advantages, among others, that embodiments of the present disclosure provide over traditional encrypted file systems. As an example of an advantage, the auditing file system may provide highly accurate, remotely readable forensic records indicating which files were accessed post-loss. If a file does not appear in those records, that suggests that no one accessed the file after device loss; if a file does appear in those records, this suggests that data was likely accessed and that the owner should take appropriate mitigating actions. As another example of an advantage, the auditing file system may prevent unauthorized users from accessing protected files post-loss by preventing key access even in the absence of network connectivity, e.g., for a disconnected USB flash memory device, an extracted laptop hard drive, and the like.

FIG. 1 illustrates a high-level timeline of three periods in the life of a lost or stolen device, along with properties a user would find desirable during each period. First is the normal use period during which the user has control of her device. During the normal use period, typical desirable properties of the auditing file system include high performance and transparency. At $T_{loss}$, the user loses control of the device. The user may not know exactly when this occurs, so $T_{loss}$ may be determined as the last point in time at which the user remembers having control. $T_{notice}$ is the time at which the user realizes that she has lost her device and takes remedial action. In our Alice scenario, for example, the exposure period ($T_{loss}$ to $T_{notice}$) is the two-hour dinner window. Between $T_{loss}$ and $T_{notice}$ may be considered the exposure period. During the exposure period, fine-grained, robust auditing is desirable. After $T_{notice}$, it is desirable to be able to remotely render protected files inaccessible.

One goal of the auditing file systems described herein is to provide strong audit security. If an unauthorized user gains control of a device and attempts to access a protected file, at least one audit log entry should be produced on a remote file access auditing server. Further, the unauthorized user should not be able to tamper with the contents of the audit log or otherwise make the audit log unavailable to the device owner.

In one embodiment, the auditing file system provides robust auditing semantics by preventing unrecorded file accesses. To achieve this, one or more auditing servers may observe data and metadata operations performed on the client. File access latency and throughput should be acceptable for protected files, even when operating over networks of various bandwidths such as local-area networks, broadband wide-area networks, wireless networks such as 3G or 4G, and the like. It may be assumed that users of the auditing file system are not technically sophisticated, and therefore the operation of the auditing file system may be kept largely transparent to them. The auditing security of the auditing file system may be independent of users' technical competence.

In one embodiment, the auditing file system produces detailed access logs of read and write accesses to individual protected files. Administrators can control the granularity and coverage of these logs. For example, an administrator may configure the auditing file system to produce audit logs for an entire file system, or only for specific files, directories, or other resources identified as sensitive.

In one embodiment, the user may also disable access to protected files after device loss, even if the device has no network or computational capabilities. If an unauthorized user has not yet accessed a protected file, then disabling access prevents access to the file in the future.

These features, among others, help provide users with accurate information about which files may have been accessed after $T_{loss}$. As a key is obtained to access to each protected file, if a request for a key for a file does not appear in the audit log, then one can confidently say that the file was not accessed. While some false positive entries in the audit log are tolerable, the chances of a false negative are minimal even if an unauthorized user uses his own software and hardware (instead of going through the auditing file system) to access the files stored on the device, since each protected file is not accessible without its associated key.

II. Auditing File System

Embodiments of the auditing file system provide at least two features: auditability and remote data control. The basic idea is simple yet powerful: (1) each file is protected with its own key, (2) all keys are stored on a remote file access auditing server, (3) a key for a file is downloaded from the remote file access auditing server each time the file is accessed, and (4) the downloaded key is destroyed shortly after use.

This approach supports auditability and remote data control. By protecting each file with a separate key and by configuring the remote file access auditing server to log all key requests, fine-grained auditability may be obtained. By disabling retrieval of keys associated with a lost device from the remote file access auditing server, further data access after $T_{notice}$ may be prevented.

As used herein, a "key" is a piece of data used to protect contents of a file. The key should be hard to derive without having prior knowledge of the key, and the contents of the file should be hard to access without having the key. In one embodiment, the key may be a decryption key, and the contents of each file may be protected and accessed by encrypting the contents and decrypting the contents using the key. Any suitable encryption method may be used, such as symmetric key cryptography, public key cryptography, identity-based cryptography (IBE), and/or the like. In another embodiment, the key may be generated as part of an all-or-nothing transformation. While not considered encryption per se, an all-or-nothing transformation nevertheless may protect the contents of a file, with a portion of the output of the all-or-nothing transformation being used as the key which may then be remotely stored. Once retrieved from the remote storage location, the key may be combined with the rest of the all-or-nothing transformation output before applying the inverse transformation to access the contents of the file. These examples should be seen as exemplary only and not limiting, as any technology currently known or developed in the future for protecting data with a key may be used in embodiments of the present disclosure.

Figure 2:
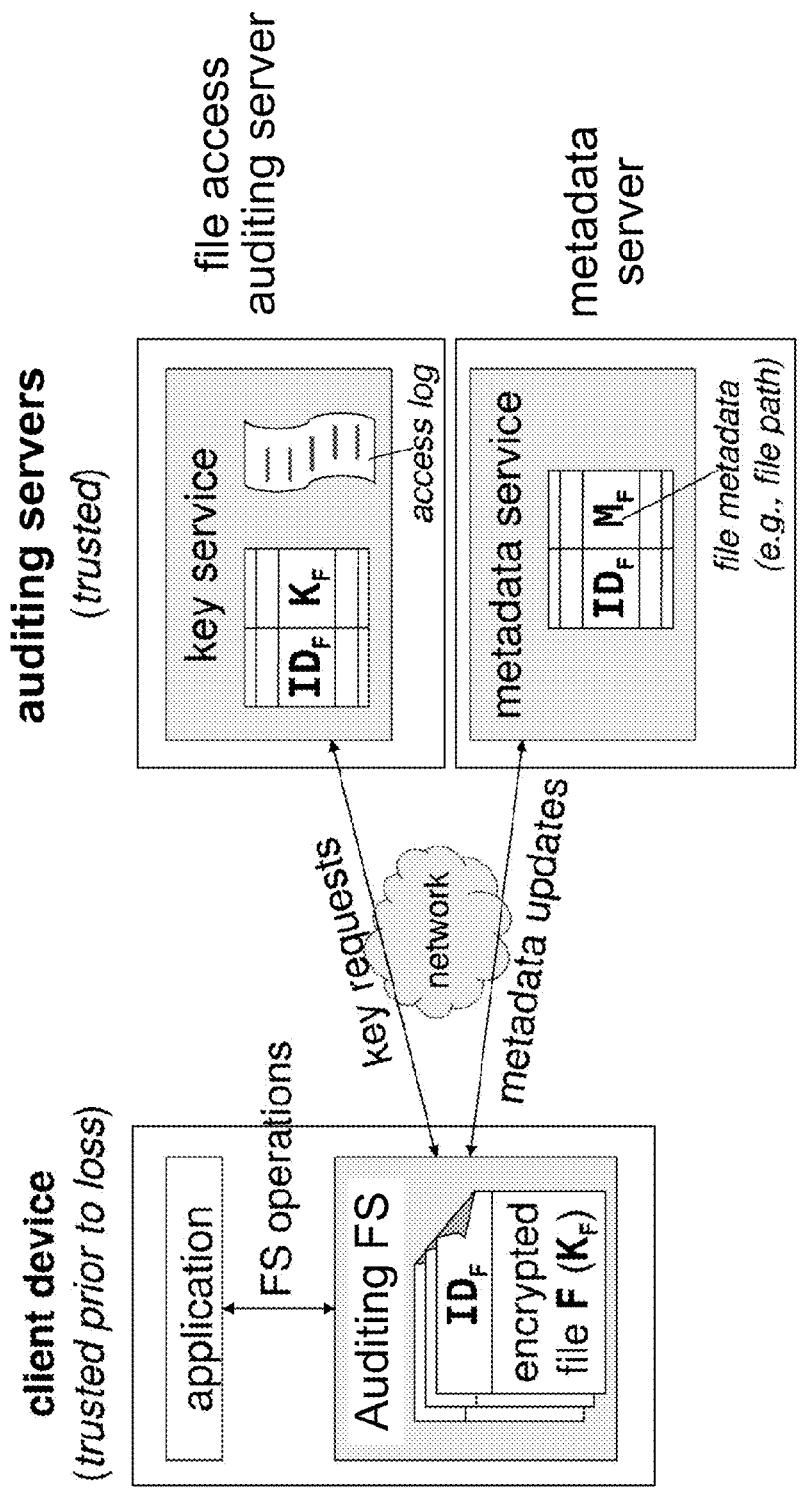
FIG. 2 illustrates one embodiment of a system for forcing auditing of file access requests, according to various aspects of the present disclosure.

FIG. 2 illustrates one embodiment of an auditing file system according to various aspects of the present disclosure. As illustrated, the auditing file system is installed on a client device. In one embodiment, the client device includes a computing device having memory configured to store data. The client device may include a processor configured to execute computer-executable instructions, but in other embodiments, the client device may simply provide data storage without additional computing functionality. The auditing file system may be particularly useful in cases where the computing device is susceptible to being lost or stolen. One example of a client device is a laptop computer. Another example of a client device is a smart phone. Other computing devices having memory configured to store data may also be protected by the auditing file system, such as a USB flash memory device, a removable disk such as a floppy disk or optical disk, a SIM card, a compact flash card, and/or the like. The auditing file system is not limited to protecting files on computing devices traditionally considered portable, but indeed may be used to audit file access on a desktop computer, a server computer, and/or the like.

In one embodiment, the auditing file system includes computer-executable instructions that, when executed, cause the protection of data within protected files associated with the client device. The auditing file system receives requests from applications to access files in storage. The auditing file system then performs actions described below to gain access to protected files and to audit the requests before providing access to the file to the requesting application. In one embodiment, the auditing file system executes on a processor of the client device, and may be implemented as an extension to an underlying file system. In another embodiment, the auditing file system may provide all file management functionality to applications wishing to retrieve data from storage associated with the client device. In still another embodiment in which the client device does not have processing capabilities of its own (such as a USB flash memory device), the auditing file system may execute on a host device, such as a computer to which the USB flash memory device is connected, to protect and audit access to files stored on the USB flash memory device.

For the sake of simplicity, the present disclosure primarily discusses the protection of a "file." However, one of ordinary skill in the art would recognize that the auditing file system is intended, in at least one embodiment, to protect data contained within a file stored by the file system. For example, an unauthorized user may be able to copy and inspect blocks representing a protected file, but is prevented from meaningfully accessing the data stored within the blocks due to encryption, obfuscation, and/or the like. One of ordinary skill in the art would also recognize that the auditing file system may be used, in at least one embodiment, to protect data with different granularity. For example, the auditing file system may protect data contained in a set of files, such as an entire directory, as a single unit. As another example, the auditing file system may protect data in a region of a storage device, such as in a block on a hard disk or a flash media device, with a key regardless of any file the block may be assigned to. Further, one of ordinary skill would also recognize that, in one embodiment, the auditing file system may also protect and audit access to resources other than files, such as network locations, hardware input/output devices, and/or the like.

On the client device, each protected file F is associated with a unique identifier called the audit ID and illustrated as $ID_F$. As illustrated, the audit ID may be stored in the file header. Any suitable unique identifier may be used for the audit ID. In one embodiment, the audit ID may be a randomly generated or sequentially generated unique integer. In another embodiment, the audit ID may be a fully qualified path and/or file name.

The file's data is protected with a unique key, $K_F$. A remote key service executing on a file access auditing server maintains the mappings between audit IDs and keys. When an application wants to read or write data to or from the protected file, the auditing file system looks up the file's audit ID in its header and requests the associated key from the remote key service. The remote key service durably logs at least the requested audit ID and information sufficient to derive an approximate time of access, such as a timestamp or the like, before transmitting the requested key to the client device. The auditing file system then uses the requested key to access the data in the protected file. The durable logging ensures that after $T_{notice}$, the user will be able to identify all compromised audit IDs by requesting all audit IDs for which there is a log entry after $T_{loss}$.

In addition to the key service, some embodiments of the present disclosure include a metadata server configured to provide a metadata service that maintains information for interpreting the access logs. The information may include file metadata such as a file's name and/or path; date/time values indicating when the file was created, accessed, or modified; a process that created the file; a description of the file; extended attributes of the file; and/or the like.

In one embodiment, the file access auditing server and the metadata server, referred to collectively as the auditing servers, are computing devices configured to perform actions described herein in relation to the key service and the metadata service, respectively. The file access auditing server and the metadata server may be located remotely from the client device, for example, being separated from the client device by a network. A network as described herein may be any suitable means for transmitting data from a first device to a second device, such as a LAN, a WAN, a WiFi network, a Bluetooth network, a cellular network such as 3G or 4G, a physical transfer of a computer-readable storage medium from the first device to the second device, and/or the like. The file access auditing server and the metadata server may also be located remotely from each other. In one embodiment, one or both of the auditing servers may be a server computer having at least a processor, a memory, a network interface, and a physical computer-readable storage medium such as a hard drive, RAM, and/or the like. In one embodiment, one or both of the auditing servers may be configured to access a remote storage device, such as a network storage device, a network-accessible database, and/or the like. In one embodiment, one or both of the auditing servers may be some other physical device configured to provide a key service or a metadata service, such as a grid computing service, a cloud computing service, a web service, a smart phone, a tablet computer and/or any other suitable computing device.

In one embodiment, the metadata service and the key service may be provided by the same physical server. In another embodiment, since the metadata service and the key service fulfill conceptually independent functions, they may be provided by separate physical servers, and may be provided by separate physical servers under the control of separate entities. Using separate providers may help to mitigate privacy concerns that could arise if a single party tracked all file access information. for example, the key service has access to audit IDs and keys, but not file names or other metadata. On the other hand, the metadata service may learn the file system's structure, the names of files, or other metadata, but does not access the audit IDs, keys, or other information used to access data in the protected files. Thus, in one embodiment, privacy-concerned users may avoid exposing full audit information to any single audit service by using different key service and metadata service providers.

The auditing file system carefully manages file metadata to help ensure robust auditing semantics. For example, when an application creates a new file with name G, the auditing file system: (1) locally allocates an audit ID ($ID_G$) for the file, (2) sends a request to the key service to create a new key $K_G$ and bind it to $ID_G$, and (3) sends a request to the metadata service to register the name G with $ID_G$. Steps 2 and 3 may occur concurrently, but in some embodiments, the auditing file system confirms that both requests have completed before allowing access to the new file. This ensures that each new key and audit ID is associated with file metadata prior to $T_{loss}$, so that any compromised keys can be correlated with their metadata after $T_{notice}$.

Figure 3A:
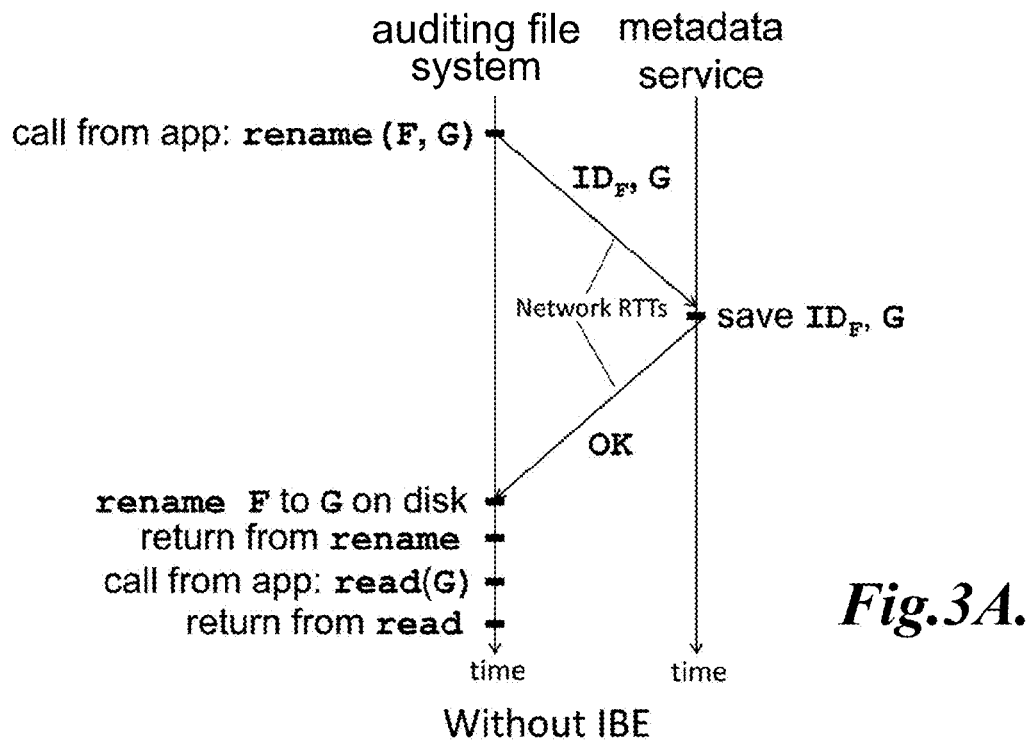
FIGS. 3A and 3B illustrate embodiments of communication between an auditing file system and a metadata service while renaming a file, according to various aspects of the present disclosure.

Similarly, during a file's lifetime, the auditing file system, for example, is capable of keeping the metadata stored by the metadata service current to ensure that a user will have fresh information in case of compromise. For example, whenever an application renames a file, the auditing file system sends a metadata update request to the metadata service, as illustrated in FIG. 3A. To help ensure that an unauthorized user does not overwrite legitimate metadata with bogus information after $T_{loss}$, some embodiments of the metadata service store metadata information and metadata updates in an append-only log.

Many embodiments of the present disclosure provide users with reliable auditing records at audit time (i.e., after $T_{loss}$). In one embodiment, for any file F with identifier $ID_F$ that was accessed after $T_{loss}$ the following properties hold: (1) the access log of the key service shows an entry indicating a request for the key associated with $ID_F$ at a time after $T_{loss}$; and (2) the metadata service stores records of all metadata updates associated with $ID_F$ before $T_{loss}$.

To support property (2), the metadata server contains the latest file metadata (such as file pathname or other attributes) that the user assigned to the file. For example, suppose a user has downloaded a blank IRS tax form into /tmp/irs_form.pdf, renamed it as /home/prepared_taxes_2011.pdf, and filled it with sensitive information. At audit time, the metadata service should contain the new path to the updated file ("/home/prepared_taxes_2011.pdf") instead of the old path to the blank form ("/tmp/irs_form.pdf") to accurately interpret the seriousness of a compromise of the file. Hence, maintaining up-to-date metadata by the metadata service may be important to enable meaningful forensics.

In one embodiment, the auditing file system may be configured to prioritize maintaining these two properties. For example, the auditing file system may download a file's key every time a block in the file is accessed, and may erase the key from memory immediately after using it, in order to maintain the first property. Similarly, the auditing file system may wait for every metadata update to be acknowledged by the metadata service before completing the metadata operation on the local disk, in order to maintain the first property.

However, prioritizing these two properties in some instances may result in unacceptable performance. If the auditing file system waits a full network roundtrip for every block access and for every metadata operation, then the system may be unacceptably slow over high-latency networks. Similarly, if the client device is not able to access the key service or the metadata service, the client device would not be able to access protected file data. In various embodiments discussed below, optimizations may be utilized to provide an acceptable level of performance while maintaining auditability and data protection in the event of device loss.

Though not illustrated or discussed above, one of ordinary skill in the art would understand that, in addition to the information discussed above, the metadata service and the key service may also store further information for categorizing file and audit data in order to enable the storage and retrieval of auditing information for multiple client devices and multiple users by the same metadata service and key service. For example, in one embodiment, the metadata service and the key service may record a client device identifier and/or a user identifier for each stored audit ID and file key, so that, after $T_{loss}$, a user may request audit logs for all files associated with the lost client device or the user without receiving audit logs for other users or other client devices.

III. Key Caching and Prefetching

To read or write data in a protected file, embodiments of the auditing file system perform a remote key-fetching request. In one embodiment, the number of such key requests may be minimized via caching and/or prefetching. For instance, instead of erasing a key immediately after use, the auditing file system may cache it for a predetermined amount of time. Similarly, on access to a file F, the auditing file system may prefetch keys for other related files, such as those in the same directory. Caching and/or prefetching may help remove remote key retrieval from the critical path of many file accesses, thereby dramatically improving performance.

While caching and prefetching may help improve performance, such improvement is balanced against increased auditing uncertainty. For example, these techniques may cause keys to accumulate in the device's memory, thereby affecting what users can deduce from the audit log of a lost device by making remote key requests unnecessary to access protected file data. Further, keys that are cached at time $T_{loss}$ are susceptible to compromise: if an unauthorized user can extract the cached keys from memory he may be able to permanently bypass auditing for those files. The user should thus make the worst case assumption that all keys cached at $T_{loss}$ are compromised. With regard to prefetching, key prefetching creates false positives in the audit log. That is, some prefetched keys may not be used, though records of the requests for those keys will appear in the logs.

Therefore, embodiments of the auditing file system use caching and prefetching carefully to maintain good auditing semantics. Though caching may be used, in one embodiment short cache lifetimes ($T_{exp}$) for cached keys are used, and keys are securely erased from the cache at expiration. This helps to reduce the number of keys that are cached in memory, as the shorter the $T_{exp}$, the fewer keys will be exposed after $T_{loss}$. Experimentally, it has been determined that key expirations as short as about 100 seconds reap most of the performance benefit of caching while exposing relatively few keys in memory at a given time. In other embodiments, keys may be deleted from the cache based on criteria other than time in the cache. For example, keys may remain in the cache until the device is rebooted, until a user locks or unlocks the device, until the device loses network connectivity, and/or the like.

For prefetching, one embodiment of the present disclosure is configured to prefetch keys when a file-scanning workload is detected (e.g., recursive file search, file hierarchy copying, and/or the like). When such a workload is detected, keys for other files in the same directory as an initial file or in the same hierarchy as the initial file may be prefetched. This benefits file-system-heavy workloads where prefetching is the most useful, while maintaining high auditing precision for light workloads (e.g., interacting with a document, and/or the like). In other embodiments, other prefetching schemes may be used to predict one or more keys that are likely to be requested in the future.

Key caching and prefetching alter the auditing semantics: instead of assuming that only key requests audited after $T_{loss}$ are questionable, a user should consider as compromised files with audit records after $T_{loss}-T_{exp}$. In other words, any key access request received after $T_{loss}$, or a short enough time before $T_{loss}$ that the key may still be stored in a cache on the device, should be considered compromised. This assumption ensures that the user will never experience false negatives, though false positives are still possible.

IV. Protecting Metadata Updates

Metadata-update file system operations (such as file create and rename) account for a significant portion of file system operations in many workloads. For example, an OpenOffice file save invokes 11 file system operations, of which 7 are metadata operations that create and then rename temporary files. This large number of metadata operations may result in poor performance of the auditing file system over slow networks if the auditing file system were to wait for an acknowledgement from the metadata service upon every metadata update before committing the update to disk. Though waiting for such an acknowledgement may help ensure that metadata changes are recorded by the metadata service, performance of the auditing file system may suffer unacceptably.

While overlapping local metadata updates with remote metadata service updates may solve the performance issues, it may create vulnerabilities in the auditing file system. For example, a user may create a new file called /home/taxes_2011, write sensitive tax information inside, and close the file and the editing application. Suppose that due to network failures the create request does not reach the metadata service and therefore the service does not learn the new file's name. If an unauthorized user obtains access to the device and attempts to access the tax file ten minutes later (presumably after any cache timeout has expired), the access attempt should produce an audit trail on the key service. However, in this scenario, accurate file metadata will not be available on the metadata service for the user to interpret the access log. Worse, the unauthorized user could block the auditing file system from attempting to resend the metadata update, and may instead send a bogus request to the service, e.g., declaring the new file's path as /tmp/download to mislead the user into thinking that a different, unimportant file was accessed.

To respond to this challenge, one embodiment of the auditing file system uses public key cryptography or identity-based encryption (IBE) in a way that avoids placing the network request on the critical path of metadata updates while retaining strong auditing semantics. To use public key cryptography, the auditing file system may encrypt information for unlocking the file content and the metadata under a public key associated with the metadata server.

IBE allows a client to perform public-key encryption using any key string it chooses as the public key. A server called a private key generator (PKG) generates the decryption key for the arbitrary public key. The PKG need not know the public key string in advance, but the public key string is provided to the PKG to learn the decryption key.

In one embodiment, the auditing file system is modified to use IBE as follows. First, a level of indirection is used to store file keys. A file F's content is protected using a locally generated data key (denoted $K_F^D$) stored in the file's header. The data key is itself encrypted under the remote key (denoted $K_F^R$), which in turn is stored by the file access auditing server.

Figure 3B:
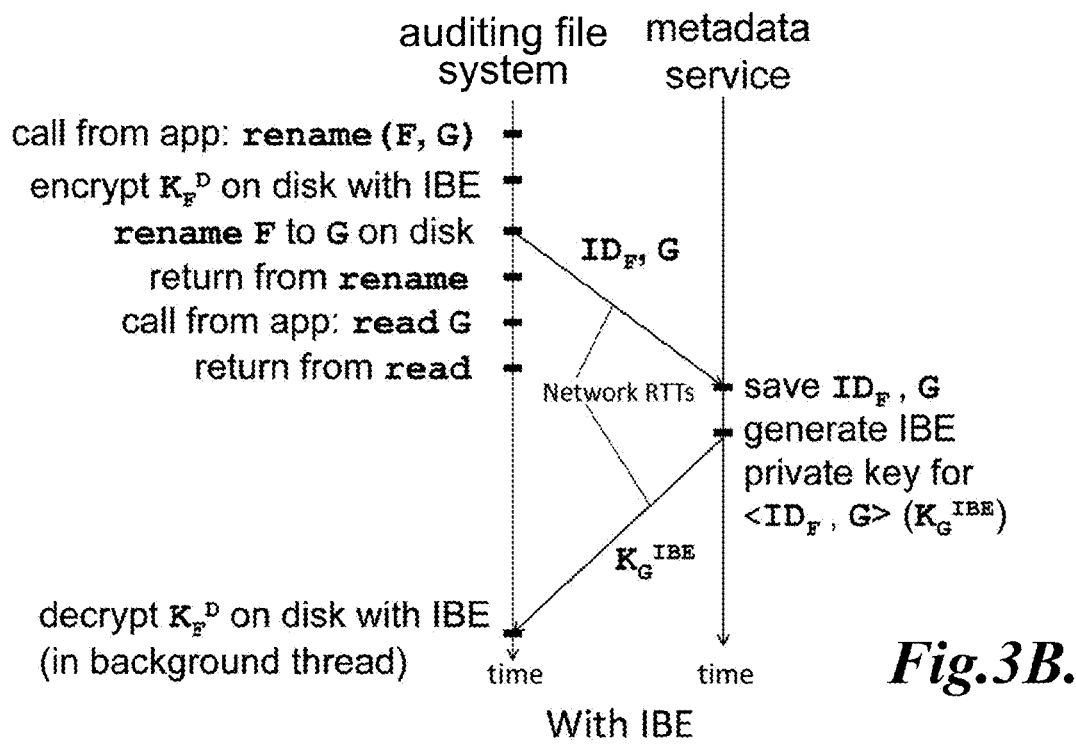

Second, the metadata service is configured to act as a PKG, as shown in FIG. 3B. When an application invokes a metadata operation (such as rename) for a file F, the auditing file system "locks" its data key $K_F^D$ in the on-disk file header by encrypting it with IBE, using the file's new pathname as the public key string. While the metadata request is in flight, reads and writes to the file data can proceed as long as a copy of the file's cleartext data key $K_F^D$ is cached. Because files with metadata updates in flight are vulnerable to attacks, the key expiration time for such files is reduced to a minimum amount likely to hide network latencies for the metadata updates. For example, one embodiment expires cached keys with in-flight metadata updates in one second instead of 100 seconds, minimizing attack opportunity while caching the key for a long enough time to likely hide network latency on, for example, a wireless network such as a 3G or 4G network. After the predetermined time elapses and the cached key is deleted, the file is essentially "locked" on disk by the IBE encryption, preventing subsequent file accesses until the metadata service confirms its success. On confirmation, the metadata service returns the IBE private key, allowing the auditing file system to access the file.

This embodiment retains a high amount of reliability with regard to its auditing functionality. For example, suppose an attack or network failure prevents the metadata service from registering new metadata relating to a file rename operation, and subsequently the client device is lost. In the extremely likely case that the theft occurred more than one second after the user's rename request, the file's cached data key will have expired and an unauthorized user would need to obtain the IBE private key in order to unlock the file for access. As a result, the unauthorized user will need to supply the correct new file pathname to the metadata service if he desires to read the file. Avoiding the metadata update will prevent the unauthorized user from gaining access, because the IBE private key will not be available. Therefore, the unauthorized user cannot access the file without causing an audit record associated with correct and up-to-date metadata to be logged by the metadata service.

V. Paired Devices

In some embodiments, the auditing file system may still function even if there is no direct communication link between the client device and the auditing servers. In one embodiment, keys may be cached for an extended period of time, and metadata registrations may be accumulated locally. However, this may force the user to give up auditability for the disconnected duration, which can defeat the purpose of the system. Further, caching may not be appropriate for storage-only devices like USB flash memory, optical disks, and/or the like. To address these issues, a paired-device may be used to support disconnected operations without sacrificing auditing semantics.

Many users are likely to carry multiple devices when they travel, such as a laptop as well as a smart phone, a tablet, and/or the like. These devices may support short-range, low-latency networks, such as Bluetooth and/or the like. The paired-device architecture, shown in FIG. 4, uses a mobile device such as a cell phone or smart phone as a transparent extension of the key service and metadata service. The auditing file system on the laptop is configured as usual, using strict caching, prefetching, and metadata registration policies to ensure fine-grained auditing as discussed above. The mobile device is configured to hoard recently used keys by downloading them from the key service and/or the metadata service before a loss of connectivity, cache the keys until connectivity is restored, log any accesses and metadata updates to a local storage location accessible by the mobile device, and upload the logs when connectivity returns. If the laptop is lost and not the mobile device, the mobile device may be used along with the file access auditing service logs to provide a full audit trail. If the mobile device is lost along with the laptop, then the audit service will indicate that files associated with keys hoarded by the mobile device are exposed, which may lead to more files being indicated as being exposed than if the laptop alone were lost.

In addition to supporting disconnected cases as described above, embodiments using a paired-device architecture can also experience improved performance over slow mobile networks without sacrificing auditing. Because the client device—mobile device link is relatively efficient, the paired device can improve performance of the auditing file system by acting as an additional cache. For example, the mobile device may be configured to perform aggressive directory-level key prefetching and caching. If the auditing file system does not have a copy of a given file key in its cache, the auditing file system contacts the mobile device via the short-range, low-latency network, and the mobile device returns the key, if available. Otherwise, the mobile device may fetch the missing key, and other related keys, from the key service before returning the key to the auditing file system. As before, auditing properties are preserved if only the client device is stolen but not the mobile device. If both devices are stolen, then auditing may only be available at a directory-level granularity.

VI. Partial Coverage

In one embodiment, additional efficiencies may be obtained by omitting one or more files on the client device from protection. Not all files necessarily require audit log entries. For example, non-sensitive files such as binaries, libraries, configuration files, and the like may be excluded from an audited protection domain. In this scenario, protected files are protected locally and their keys and metadata are stored remotely. Unprotected files may be encrypted locally, but their encryption keys are derived from the user's login credentials. The benefits of this optimization are obvious: the performance and availability costs of the auditing file system are only incurred for protected files. There is also a risk: if sensitive data is accidentally placed in an unprotected file or directory, the audit logs will not reveal accesses to that sensitive data. One reasonable protection policy is to track accesses to any file in crucial directories, such as the user's home and temporary directory (e.g., /home and /tmp on Linux, and/or the like).

VII. Exemplary Embodiment

An exemplary embodiment of the auditing file system, the key service, and the metadata service is described below. One of ordinary skill in the art understands that this embodiment is exemplary only, and that the present disclosure includes alterations described elsewhere herein, as well as alterations that would be within the ability of one of ordinary skill in the art, without departing from the scope of the disclosure.

In the exemplary embodiment, the auditing file system may be developed as an extension of EncFS, an open-source blocklevel encrypted file system based on FUSE. Each of the elements of the auditing file system may communicate via encrypted XML-RPC over persistent connections. EncFS may encrypt all files, directories, and names under a single volume key which is stored on disk and encrypted using the user's password. The auditing file system extends EncFS in at least two ways. EncFS is modified to encrypt each file with its own per-file symmetric key. The single volume key is used to protect file headers and the file system's namespace, e.g., file and directory names. The auditing file system stores all file keys on a remote key server and maintains up-to-date metadata on a metadata server.

To support forensic analysis, the remote key server and/or the metadata server may provide an interface that allows queries of the auditing logs to be performed. In one aspect, given a $T_{loss}$ timestamp and an expiration time, $T_{exp}$, the interface may reconstruct a full-fidelity audit report of all accesses after $T_{loss}$-$T_{exp}$, including full path names and access timestamps, either for programmatic consumption or for display to a user.

FIG. 5A illustrates the internal structure of a protected file F in the exemplary embodiment. The protected file F includes two regions: the file's header and the file's content. In the exemplary embodiment, the file's header is fixed size and is encrypted using the volume key of EncFS. For the file's content, the exemplary embodiment adds a level of indirection for encryption keys to support techniques such as IBE efficiently. File F's content is encrypted using a 256-bit random data key, denoted $K_F^D$. The data key is stored in the file's header encrypted using the remote key, denoted $K_F^R$. The remote key is stored on the key server and is identified by the file's audit ID ($ID_F$), which is a randomly generated 192-bit integer that is stored in the file's header along with the encrypted data key. This internal file structure is transparent to applications, which see only the decrypted contents of a requested file.

The exemplary embodiment of the auditing file system intercepts and alters two types of EncFS operations: file-content operations (read, write) and metadata-update operations (create, rename for files or directories, and/or the like). When an application accesses file content, the auditing file system: (1) looks up the file's audit ID from its header, (2) retrieves the remote key $K_F^R$, either from the local cache or the key service, (3) decrypts the data key $K_F^D$ using $K_F^R$, (4) caches $K_F^D$ temporarily, and (5) decrypts/encrypts the data using $K_F^D$.

When an application creates or updates file metadata, the auditing file system: (1) locks the data key using IBE, if enabled, and (2) sends the new metadata to the metadata service. The metadata includes the file's path reported as a tuple of the form directoryID/filename. The names of directories are also kept current on the metadata service.

The exemplary embodiment of the auditing file system caches keys for a limited time to improve performance. A background thread purges expired keys from the cache once a predetermined amount of time has elapsed for the expired key. If a key has been reused during its expiration period, the thread requests the key from the key service again, causing an audit record to be appended to the access log for that audit ID. If a response arrives before the key expires, the key's expiration time is updated in the cache, otherwise the key is allowed to expire from the cache. As a result, absent network failures, cached keys should not expire while actively being used. This helps to ensure that long-term file accesses, such as playing a movie, will not exhibit hiccups due to unnecessary remote-key fetching.

The exemplary embodiment of the auditing file system may be configured to perform key prefetching. As discussed above, key prefetching attempts to anticipate future file accesses by requesting file keys before the files are accessed. A full-directory-prefetch scheme that prefetches all keys in a directory when it detects that the directory is being scanned by an application has shown to provide adequate performance while incurring fewer false positives in the audit logs than alternative schemes. However, other suitable schemes, such as randomly choosing keys to prefetch within a directory, may be used instead. The intuition behind the full-directory-prefetch scheme is to avoid producing false positives for targeted workloads (such as interacting with a document, viewing a video, etc.) and to improve performance for scanning workloads (such as grepping through the files in a directory or copying a directory). The full-directory-prefetch scheme may avoid recursive prefetches to help ensure that any false positives are triggered by real accesses to files in the same directory. While other more effective prefetching policies may exist, results have shown that the full-directory-prefetch policy, combined with our caching policies, reduces the number of blocking key requests to a point where the performance bottleneck shifts from blocking key requests to metadata requests.

To avoid blocking for metadata-update requests, the exemplary embodiment implements IBE-based metadata registration, using an open-source IBE package. On a metadata-update operation, the auditing file system locks the file until the metadata service confirms the receipt of the new file path. File operations are allowed proceed for a one-second window, as previously described, to absorb the registration latency. FIG. 5B illustrates the structure of an IBE-locked file. Its encrypted data key is further encrypted using IBE under a public key including the file's path (directoryID/filename) and the audit ID ($ID_F$). Embedding $ID_F$ into the public key strongly binds $ID_F$ and the path together at the metadata server. Handling updates for other types of file metadata functions (such as setfattr) may be similarly supported.

Figure 4:
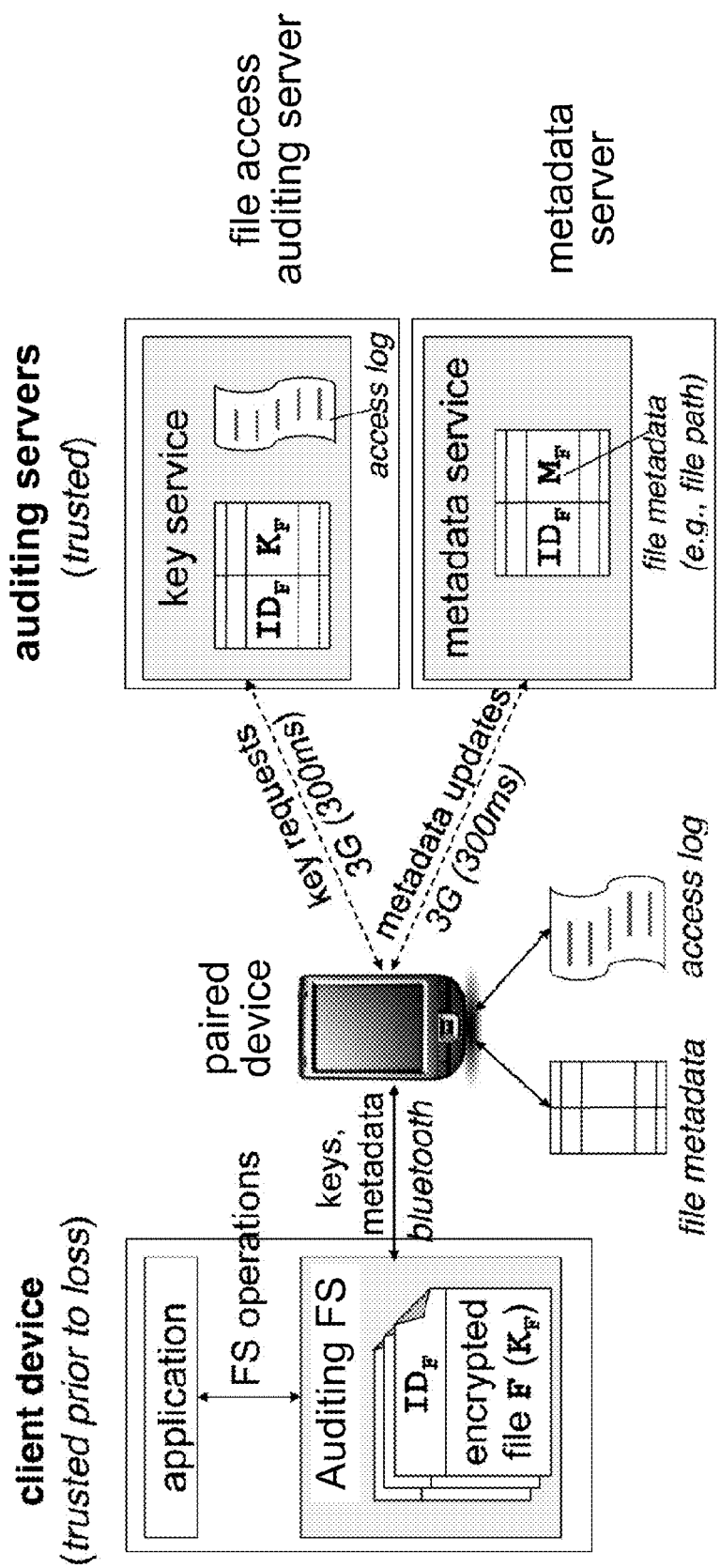
FIG. 4 illustrates one embodiment of a system for forcing auditing of file access requests that includes a paired device, according to various aspects of the present disclosure.

The exemplary embodiment may also be configured to use the paired-device architecture illustrated in FIG. 4. A simple daemon on the mobile device accepts key requests from the client device via a local network such as Bluetooth, saves records of such requests to a local database, responds to the client device, and uploads access and metadata information to key servers and metadata servers in bulk when a wireless connection to the servers becomes available.

VIII. Performance Evaluation of Exemplary Embodiment

The exemplary embodiment was evaluated for performance and auditing quality.

For the experiments documented below, the auditing file system was installed on an eight-core 2 GHz x86 personal computer running Linux 2.6.31 as the client device. The key service and metadata service daemons ran on 8 core 2.6 GHz server computers each having 24 GB of RAM and connected via gigabit Ethernet. A traffic control utility was used to emulate different network latencies.

Throughout the evaluation, the following round trip times (RTTs) were emulated to simulate various networks: 0.1 ms RTT for a LAN, 2 ms RTT for a wireless LAN (WLAN), 25 ms RTT for broadband, 125 ms RTT for a DSL network, and 300 ms RTT for a 3G cellular network. To illustrate network latency effects on performance of the auditing file system, examples are used below from extreme network conditions, such as fast LANs and slow 3G networks, even though popular mobile connections today rely on WLAN and 4G.

File content (read and write) and metadata (create, rename, and mkdir) operations were benchmarked to profile the performance of the auditing file system. Measurements included client, server, and network latencies, as well as latency contributions for EncFS and the auditing file system.

Figure 6A:
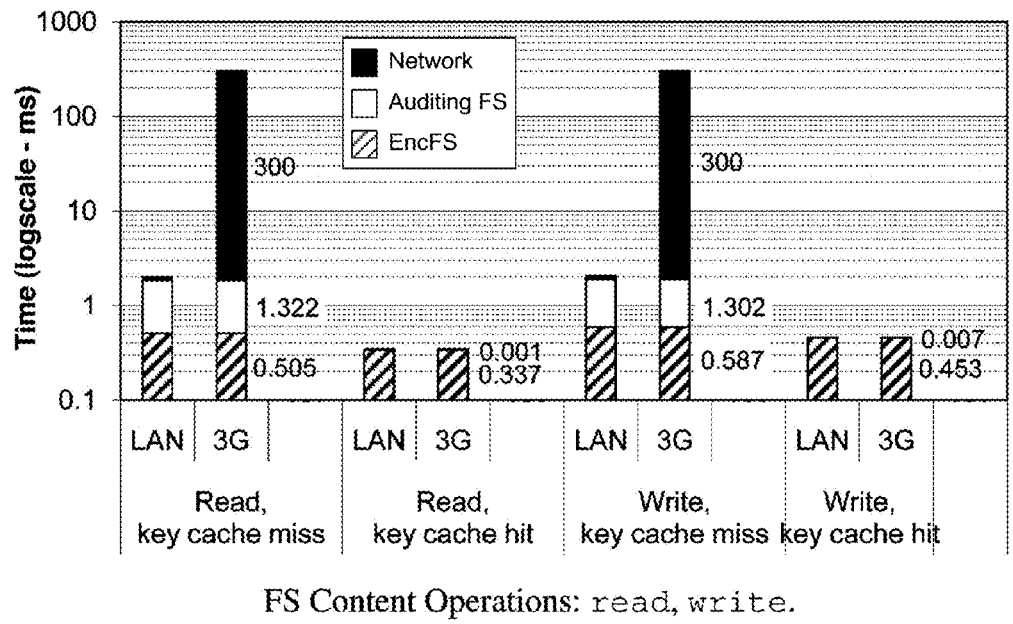
FIG. 6A is a bar graph that illustrates measured latency of file read and write operations of an exemplary embodiment of the present disclosure.

FIG. 6A illustrates measured latency of file read and write operations for two cases: key-cache misses, which fetch the key from the key server, and key-cache hits, which use a locally cached key. For each case data is shown for two extreme networks: a fast 0.1 ms-RTT LAN and a slow 300 ms-RTT 3G network. The results show that misses are expensive on both networks. However, the expense in each case is for different reasons. On a LAN, the network is insignificant, but the auditing file system adds to the base EncFS time due to XML-RPC marshalling overhead. On 3G, network latency dominates. When the key-cache hits, both the network and marshalling costs are eliminated; a file read with a cached key is only 0.01 ms slower than the base EncFS read time of 0.337 ms. This shows the importance of key caching to avoid misses, which may be accomplished by carefully choosing and configuring expiration and prefetching policies.

Figure 6B:
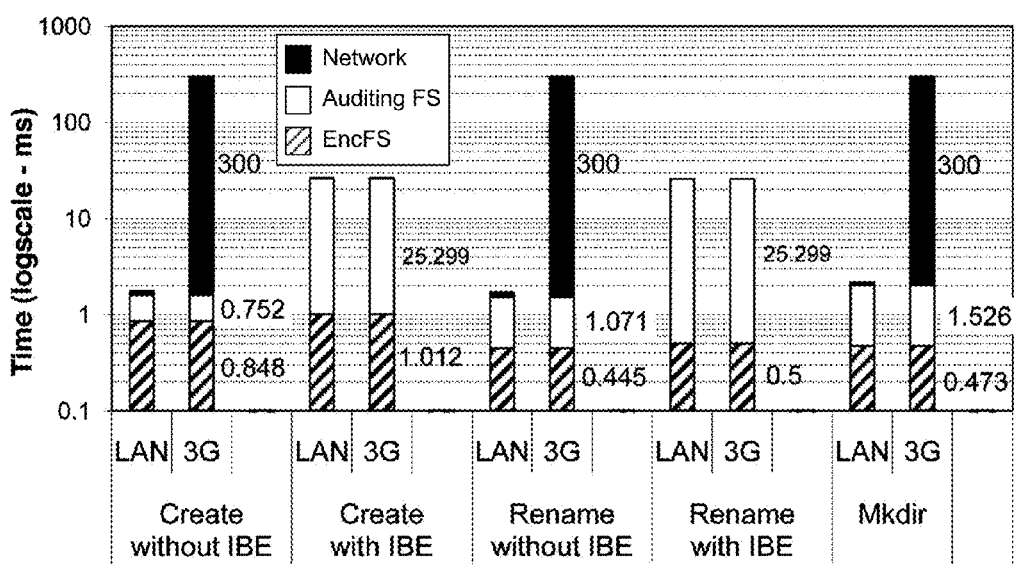
FIG. 6B is a bar graph that illustrates measured latency of file metadata update operations of an exemplary embodiment of the present disclosure.

FIG. 6B illustrates measured latency of file metadata update operations. For create and rename, latency is shown with and without IBE; mkdir is shown only without IBE, since it does not benefit from this optimization in the exemplary embodiment. Without IBE, metadata update latency is driven primarily by network RTT: file creation takes 1.618 ms on a LAN, and 302 ms over 3G. With IBE, metadata update latency is independent of network delay and is dominated by the computational cost of IBE itself. The figure shows that IBE meets its goal of improving performance of metadata updates over 3G. While IBE would add overhead for a LAN, it may be unnecessary and could be disabled in the LAN environment.

The effectiveness of various optimizations were tested on a challenging workload: Apache compilation. While this workload is not characteristic of mobile devices, its complex nature and intensive use of file system operations make it suitable for evaluating the impact of various optimizations.

As a baseline, the Apache compilation takes 112 s using the unmodified EncFS encrypted file system (i.e., with encryption but without auditing) and 63 s on ext3 (i.e., without encryption or auditing). Because the exemplary embodiment of the auditing file system enhances EncFS, the fair baseline comparison for the exemplary embodiment is EncFS.

Figure 7:
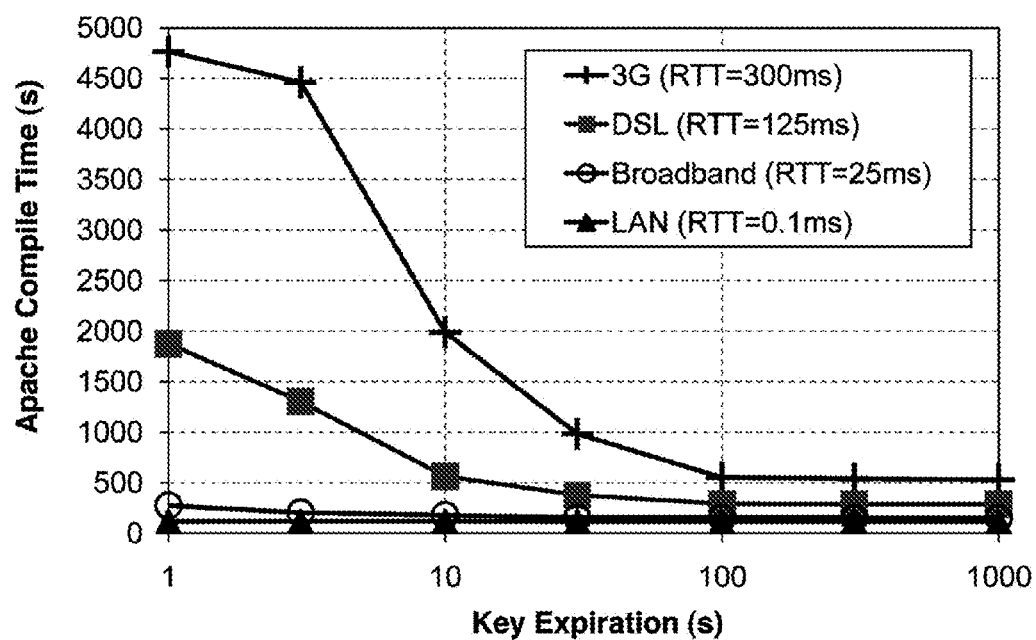
FIG. 7 is a line graph that illustrates a result of a test performed by an exemplary embodiment of the present disclosure using various key cache expiration policies.

FIG. 7 illustrates the effect of key caching without any other optimizations enabled. A 100-s key expiration time appears to be nearly optimal, and achieves compilation times of 115 s, 153 s, 292 s, and 551 s over a LAN, Broadband, DSL, and 3G, respectively. For comparison, the Apache compilation takes 112 s on the unmodified EncFS and 63 s on ext3.

FIG. 7 also shows that key caching can greatly increase performance. Even a cache with one-second expiration time has significant impact: 18% improvement on a LAN and 490% improvement on 3G, relative to no caching at all. FIG. 7 shows additional improvements for Apache compilation time as expirations are lengthened beyond one second. These results suggest that short expiration times are sufficient to extract nearly all the performance benefits of key caching. For LAN, Broadband, or DSL latencies, an expiration of 10 s or so appears to be optimal. Over 3G, a 100 s key expiration time achieves all the benefit and provides 860% improvement over a 1 s expiration time (from 79.4 minutes down to 9.2 minutes). In comparison to EncFS, the auditing file system's performance degradation for 100 s expiration times is already small over a LAN (5.3% overhead over EncFS), while for the other network types, further optimizations may be desired to improve performance even more.

Note that a 100 s cache timeout is extremely small with respect to the likely time it would take to compromise a lost client device. To benefit from cached keys, an unauthorized user would have to obtain access to the device within 100 seconds of the user's last access. Even in such cases, the user will know which files were exposed.

Key caching alone may help avoid many key service requests: of the 75,744 reads and writes in the Apache compilation, only 486 involve the key server when using a 100 s expiration time. Directory-key prefetching may be used to avoid even more server requests. Prefetching a directory key on the first, third, or tenth miss in a directory results in 101, 249, and 424 key-cache misses, which translates into 63.3%, 24.1%, and 2.4% improvements, respectively, over not using directory-key prefetching over 3G. A prefetch-on-third-miss policy was used to strike a good balance between performance and auditing quality. Over fast networks, such as a LAN and WLAN, the prefetch-on-third-miss policy coupled with 100 s key caching timeouts resulted in negligible performance overheads compared to EncFS: 2.8% for LAN and 4.3% for WLAN. Over slower networks, especially 3G, other smarter prefetching policies may improve performance by further eliminating blocking key requests. However, with the simple prefetching policy, the dominating runtime component now becomes the blocking metadata requests (932 blocking metadata requests compared to the 249 blocking key requests).

Figure 8A:
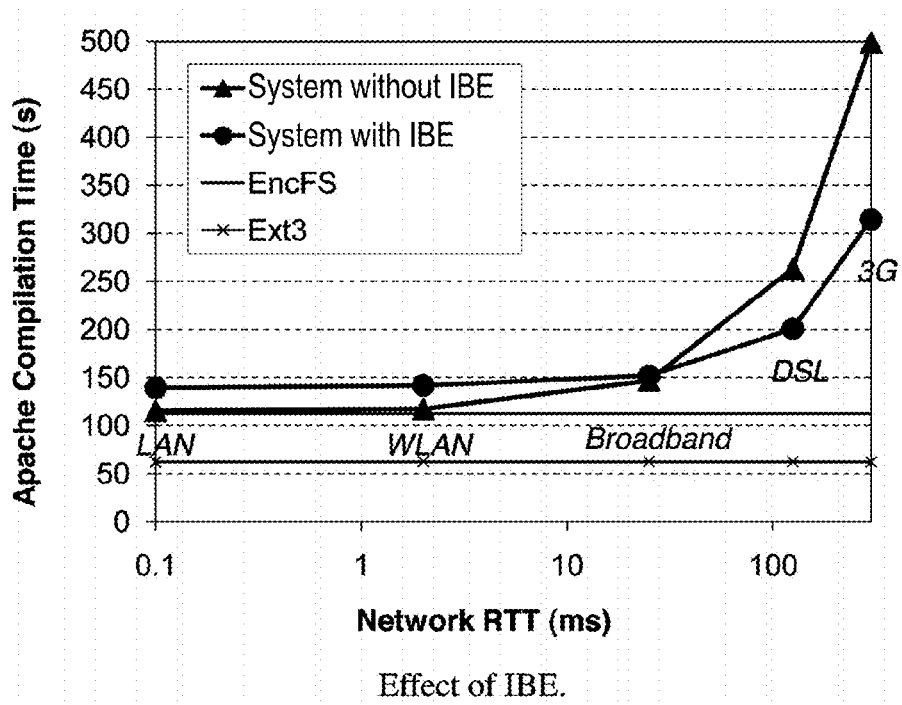
FIG. 8A is a line graph that illustrates a result of a test performed by an exemplary embodiment of the present disclosure using identity-based cryptography.

IBE may be used to help mitigate the effects of latency of metadata service requests over slow mobile networks. FIG. 8A illustrates the impact of IBE on Apache compilation as a function of network RTT. As shown in the figure, IBE provides dramatic improvements on high-latency networks, including 3G- and 4G-class networks. For example, IBE improves the benchmark's performance on 3G by 36.9%. The crossover for IBE is around 25 ms, i.e., it should be used only for networks with RTTs over 25 ms and disabled otherwise. As mentioned above, for faster networks, such as LANs or WLANs, IBE may not even be necessary, as the communication overhead of the auditing file system is already negligible after applying key caching and prefetching.

Figure 8B:
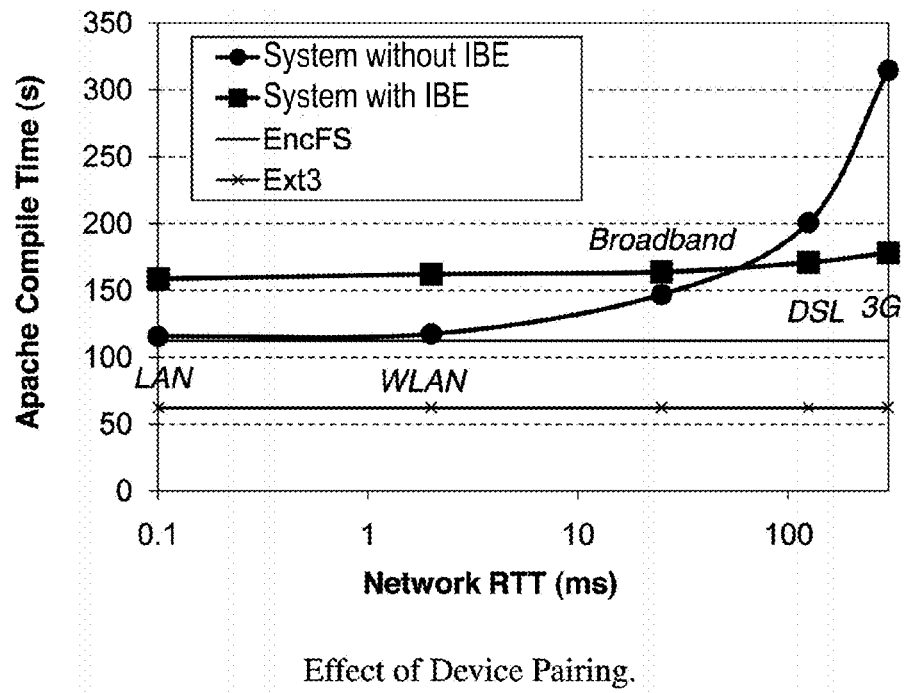
FIG. 8B is a line graph that illustrates a result of a test performed by an exemplary embodiment of the present disclosure using a paired device.

Use of a paired device facilitates disconnected operation, but may also provide performance benefits for high-latency network environments. FIG. 8B illustrates the effect on the Apache workload of using a paired device as a caching proxy for key and metadata services. At least two conclusions can be reached from the figure. First, performance for disconnected operation over Bluetooth should be similar to or better than that of a broadband connection, as the latencies are similar. Second, pairing with another device should be beneficial for performance over cellular networks, because most file operations only use communication over the lower latency Bluetooth link.

Figure 9A:
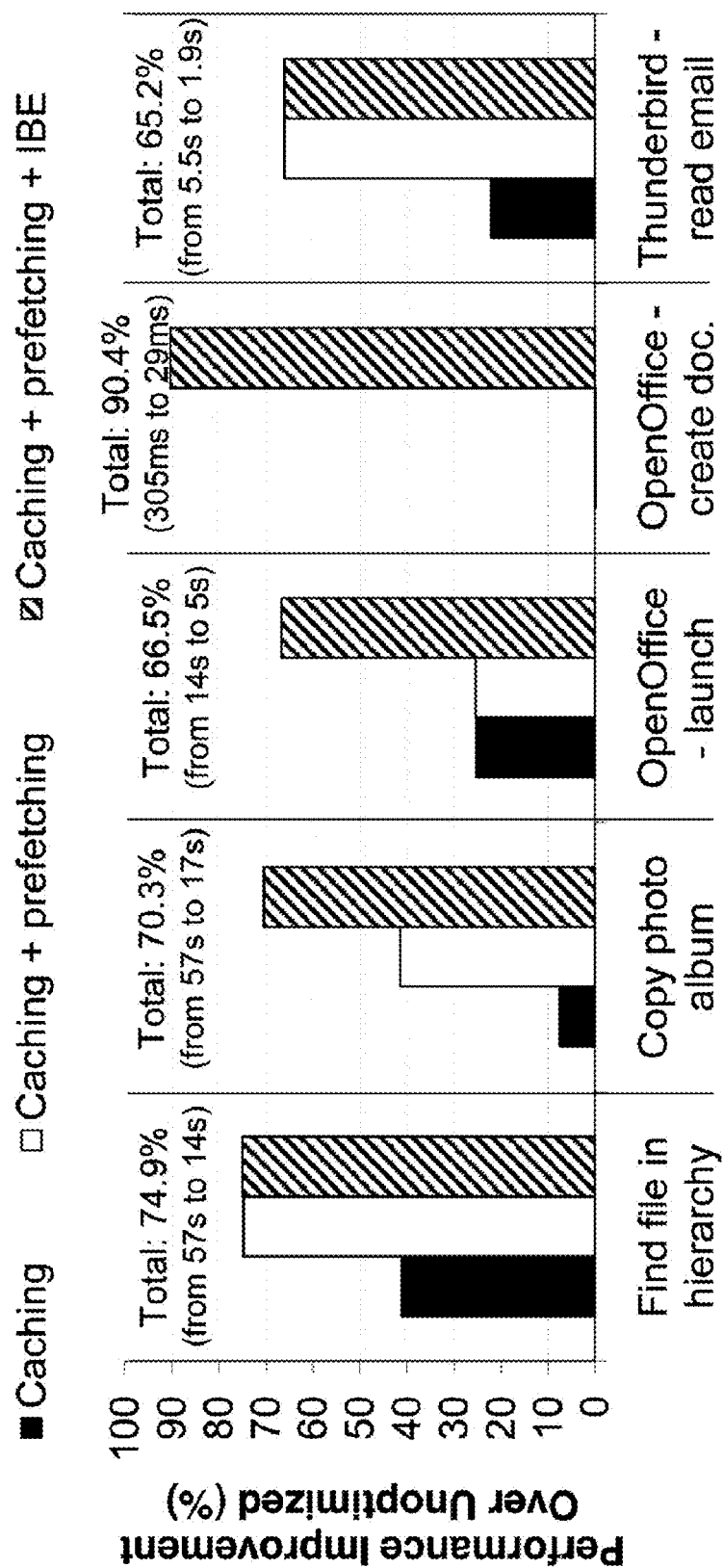
FIG. 9A is a bar graph that illustrates comparisons of various optimizations applied to an exemplary embodiment of the present disclosure during typical office-oriented task workloads.

FIG. 9A illustrates the impact of various optimizations on typical office-oriented workloads within the exemplary embodiment. The optimizations were tested on an emulated 3G network.

Optimizations are added incrementally, and additional improvement is noted as more optimizations are added. The labels on top of each bar group show the total improvement with all three optimizations enabled. Different workloads obtain different benefits from different optimizations, depending primarily on the relative frequency of various operations. For example, caching and prefetching provide great benefits for a read-intensive workload such as a recursive grep (e.g., finding a file having particular contents within a directory hierarchy), which reads each file in a target directory hierarchy. IBE provides large improvements for workloads that create files, such as an OpenOffice document creation. For mixed content/metadata workloads, such as copying a photo album across directories, all optimizations provide substantial benefits.

To better understand performance across many applications, benchmarks were obtained to profile the time used by the exemplary embodiment to perform a number of popular tasks over several emulated networks. Results of such testing are shown in FIG. 9B, including results for both warm and cold key caches. A user will likely experience both warm cache and cold cache conditions, but with well-chosen key expiration times many operations will be handled by a warm cache.

From a user's perspective, the exemplary embodiment of the auditing file system performed very similarly to EncFS over fast networks, such as a LAN and a wireless LAN. Hence, while at the office, the user should not be adversely affected by the use of the auditing file system, whether the key cache is warm or cold. With only a few exceptions, the user should perceive similar application performance over broadband when comparing the auditing file system to an unmodified EncFS. Over mobile networks, the user may notice some application slowdown when using the auditing file system, especially after extended periods of inactivity. As shown in FIG. 9B, application launches are particularly expensive over 3G networks, as they often encounter a cold cache and many file system interactions. In one embodiment, the auditing file system could optimize application launching by profiling applications and prefetching keys associated with launching the application.

IX. Auditing Properties after Optimization

The various optimizations applied to the exemplary embodiment of the auditing file system may also affect the accuracy of the auditing functionality. As discussed above, keys for recently-accessed or prefetched files may be stored in a cache until an expiration period $T_{exp}$ elapses. If the auditing file system is protecting a passive storage device, such as a USB flash memory device or the like, keys stored in a memory cache on a host laptop, personal computer, or the like are not compromised if the passive storage device alone is lost. For a laptop or other client device having memory used to store the cache, because an unauthorized user can theoretically access cached-key files without triggering a server-side audit log, users should consider all files whose keys were retrieved between $T_{loss}$-$T_{exp}$ and $T_{loss}$ (in other words, files whose keys were stored in the cache at $T_{loss}$) as compromised whether additional key request records appear in the audit log. The size of this set at any point in time depends at least on the user's workload and on the aggressiveness of the caching and prefetching schemes.

Figure 10:
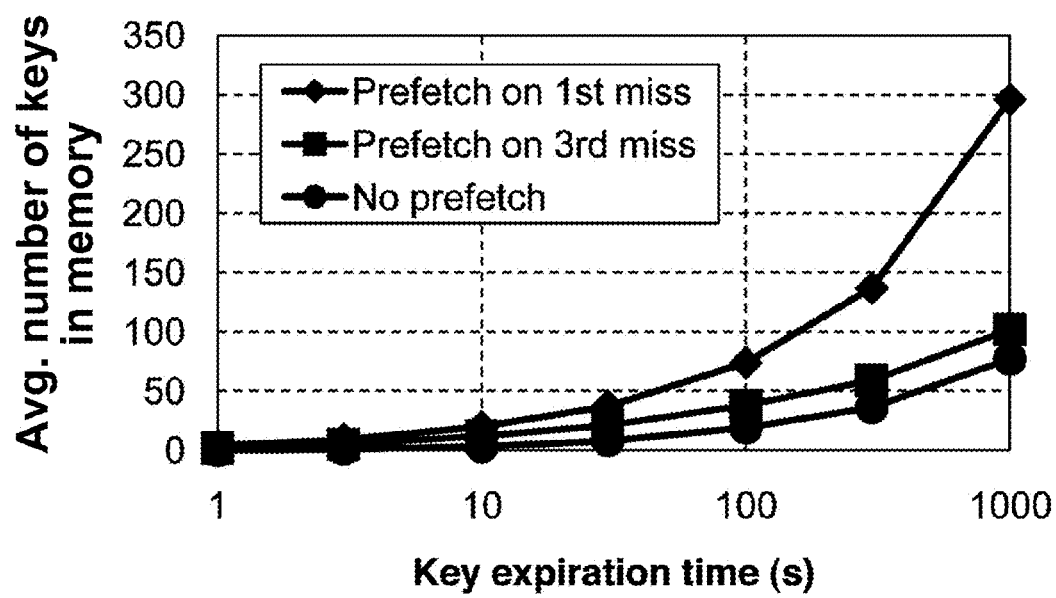
FIG. 10 is a line graph that illustrates an average number of keys stored by an exemplary embodiment of the present disclosure under various key expiration policies.

FIG. 10 illustrates a number of in-memory keys measured at any point in time during typical laptop usage, averaged over use periods, for various key expiration times and prefetching policies in the exemplary embodiment. The graph shows that for reasonable key expiration and prefetching strategies, such as no prefetching or prefetching on a third cache miss, and such as key expiration times less than or equal to about 100 seconds, the average number of in-memory keys is relatively small. For example, with a 100-second key expiration time and a prefetch-directory-on-third-miss strategy, on average there were 38 keys in memory at any instant. This is a small number of total keys, and furthermore, most of the keys are present in the cache as a side-effect of prefetching; i.e., they are files in the same directory as a file that was accessed by a user or program.

Prefetching affects forensics by introducing false positives in the audit log. The rate of false positives depends on the prefetching policy as well as the workload of an unauthorized user, since false positives are of concern at a time post-$T_{loss}$. In the absence of a likely workload of an unauthorized user, a few scenarios that an unauthorized user might follow were tested on the exemplary embodiment of the auditing file system to gauge the impact of various prefetching policies on the rate of false positives as the unauthorized user tries to find sensitive information on a protected device. Three scenarios were investigated: (1) the unauthorized user launches an email client such as Thunderbird, reads a few emails, browses folders, and searches for emails with a particular keyword; (2) the unauthorized user launches a document editor and looks at a few files; and (3) the unauthorized user inspects the history, bookmarks, cookies, and passwords in a web browser window. For these workloads, a prefetch policy of prefetching directory keys on the 3rd miss led to the following ratios between false positives and total accessed keys: 3:30, 6:67, and 0:12 for our email, document editor, and web browser workloads, respectively. Audit precision is high for these scenarios.

Even in cases where false positives are created through prefetching, the metadata log may be used to determine the seriousness of the false positives. For example, it was determined that if the unauthorized user uses a web browser to navigate to a web page, loading several files from the web cache directory causes the auditing file system to prefetch keys for the entire web cache directory. While this causes several false positives, the user may learn by inspecting the metadata logs that the activity occurred in the web cache directory, as opposed to a directory containing sensitive information. Even in such cases, the auditing implications of the non-recursive directory prefetching policy are minimal, since false positives should be localized to one directory.

X. Additional Security Features

Embodiments of the present disclosure provide strong audit guarantees for encrypted file systems even if an optional first layer of defense, such as encryption with a password or cryptographic token, is breached. Additionally, some embodiments of the present disclosure may allow a user to destroy the ability to read files after a mobile device is reported lost.

The key service and metadata service are configured to maintain accurate logs, and are assumed to incorporate strong defenses to adversarial comprise, to routinely back up their state, and to have their own internal access auditing mechanisms. In one embodiment, neither the key service nor the metadata service is, however, fully trusted with all of the audited information about a user's file access patterns prior to $T_{loss}$. Instead, the key service stores information such as the audit ID and the file key, whereas the metadata service stores information such as the audit ID and the file path. Combining the information to form a comprehensive picture of the users file access patterns requires collusion between both services, or the user's invocation of post-loss audit mechanisms to combine the information.

In one embodiment, communications between the auditing file system and the servers should be encrypted to ward off attackers who intercept network communications prior to device theft. The keys used to encrypt communications should change every $T_{exp}$ seconds to ensure that an attacker who extracts the current network encryption key from the device cannot use it to decrypt data intercepted in the past.

When a protected device is lost and its key cache is cold, empty, or unavailable (such as a powered-down laptop or a USB flash memory device), then a successful attempt to access a protected file generates at least one log record on the auditing servers. This should be true whether the unauthorized user uses the auditing file system or his own hardware or software to perform the access. The features of the auditing file system, including the storing of $K_F^R$ on remote servers, the entangling of the metadata server and key server states to ensure consistency, and the method for using IBE, each help to enforce this property. Additionally, the selection of 192-bit audit IDs at random makes it infeasible for an attacker to request information about valid audit IDs from the key and metadata servers prior to physically obtaining the protected device. In one embodiment, such requests may additionally be thwarted by separately authenticating the protected device to the auditing servers.

Unauthorized users who obtain protected devices with warm caches—such as running or hibernated laptops—may seek to avoid the protections of the auditing file system by directly obtaining keys from the device's memory. Accordingly, in one embodiment, cached keys $K_F^R$ may be evicted from memory upon device hibernation. Additionally, records of such evictions may be stored by the auditing servers. For fully running devices, it may be assumed that an unauthorized user has accessed any file with an audit log entry after $T_{loss}$-$T_{exp}$. A forensic analyst should acknowledge that applications may have loaded sensitive data into memory, and that this data may be available outside of the protected file system. In one embodiment, encrypted memory technology may be coupled with auditing to prevent access to such data in memory.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A computer-implemented method for forcing file access auditing, the method comprising:
   receiving, by an auditing file system executing on a processor associated with a protected computing device, a request to access a protected file;
   receiving, by the auditing file system of the protected computing device from a remote file access auditing server, a file key that allows access to data within the protected file;
   providing access to data within the protected file by the auditing file system of the protected computing device in response to the request by using the file key;
   protecting data within the protected file using a data key;
   protecting the data key by using the file key to create a protected data key;
   receiving a request to update metadata associated with the protected file;
   transmitting, to a remote metadata access auditing server, a metadata update notification; and
   protecting the protected data key using cryptography to create a further protected data key;
   wherein the further protected data key remains protected using cryptography at least until receipt of an acknowledgement of the metadata update notification from the metadata access auditing server.

2. The method of claim 1, further comprising:
   storing the file key; and
   deleting the stored file key after a predetermined first amount of time elapses.

3. The method of claim 2, further comprising:
   receiving an acknowledgement from the remote file access auditing server of an additional request to access the protected file before the predetermined first amount of time elapses; and resetting the predetermined first amount of time to elapse before deleting the stored file key.

4. The method of claim 1, wherein providing access to data within the protected file in response to the request by using the file key includes providing access to data within the protected file in response to the request by using the file key to access the data key from the protected data key, and by using the data key to provide access to the data within the protected file.

5. The method of claim 4, wherein the metadata update notification includes one or more metadata changes.

6. The method of claim 5, wherein protecting the protected data key using cryptography to create a further protected data key includes:
protecting at least a portion of metadata associated with the protected file and further protecting the protected data key using a public key associated with the remote metadata access auditing server to create the further protected data key;
wherein the metadata and protected data key remain protected using the public key at least until receipt of an acknowledgement of the metadata update notification from the metadata access auditing server.

7. The method of claim 6, further comprising:
transmitting the protected metadata and the further protected data key to the metadata access auditing server; and
receiving from the metadata access auditing server the protected data key in response to the metadata access auditing server retrieving the protected data key from the further protected data key by using a private key of the metadata access auditing server.

8. The method of claim 5, wherein protecting the protected data key using cryptography to create a further protected data key includes:
protecting at least a portion of metadata associated with the protected file and further protecting the protected data key using identity-based cryptography to create a further protected data key, wherein a public key used for identity-based cryptography is based at least on a changed portion of the metadata associated with the protected file;
wherein the metadata and protected data key remain protected using identity-based cryptography at least until receipt of the acknowledgement of the metadata update notification from the metadata access auditing server.

9. The method of claim 8, further comprising:
transmitting, to the metadata access auditing server, the changed portion of the metadata on which the public key was based; and
receiving from the metadata access auditing server a private key usable to access the further protected data key, the private key corresponding to the public key.

10. The method of claim 1, further comprising:
receiving, from a file access auditing server, one or more prefetched keys that allow access to data within files related to the protected file.

11. The method of claim 1, wherein providing access to data within the protected file in response to the request by using the file key includes accessing data within the file using at least one of a public key cryptography algorithm, a symmetric key cryptography algorithm, an identity-based cryptography algorithm, or an all-or-nothing transformation algorithm.

12. The method of claim 1, wherein receiving, from the remote file access auditing server, the file key that allows access to data within the protected file includes receiving the file key from a paired device that previously received the file key from the remote file access auditing server.

13. The method of claim 1, further comprising using a trusted platform module (TPM) device to store one or more keys.

14. A computer-implemented method for associating metadata with file access request audit logs, the method comprising:
allocating, by a client device, an audit ID for the file;
registering, by the client device, a file with an auditing file system of the client device, wherein the file is associated with metadata, and wherein registering the file includes transmitting, by the client device, the audit ID and the metadata to a remote metadata access auditing server; and
in response to a request to update the metadata:
encrypting, by the client device, a first portion of the metadata using an identity-based cryptography public key to create encrypted metadata and thereby prevent access to the first portion of the metadata, wherein the identity-based cryptography public key is based on a second portion of the metadata;
transmitting, by the client device, a metadata update request to the remote metadata access auditing server; and
in response to receiving a metadata update confirmation from the remote metadata access auditing server, decrypting, by the client device, the encrypted metadata using an identity-based cryptography private key and thereby allow access to the first portion of the metadata, wherein the identity-based cryptography private key is included in the metadata update confirmation from the remote metadata access auditing server.

15. The computer-implemented method of claim 14, wherein the metadata includes at least one of a file path, a creating process, a file description, and an extended attribute.

16. The computer-implemented method of claim 14, further comprising:
transmitting the audit ID to a remote file access auditing server;
receiving a file key from the remote file access auditing server; and
protecting contents of the file using the file key.

17. The computer-implemented method of claim 14, further comprising:
generating a file key;
protecting contents of the file using the file key; and
transmitting the audit ID and the file key to a remote file access auditing server.

18. The computer-implemented method of claim 16, wherein the remote file access auditing server is separate from the remote metadata access auditing server.

19. The computer-implemented method of claim 14, further comprising updating the metadata in a local storage device in response to receiving the metadata update confirmation.

20. A computer-implemented method for auditing file accesses, the method comprising:
allocating, by a client device, an audit ID for a file;
generating, by the client device, a file key;
protecting, by an auditing file system of the client device, contents of the file using the file key;
transmitting, by the client device, the audit ID and the file key to a remote file access auditing server;

transmitting, by the client device, the audit ID and metadata associated with the file to a remote metadata access auditing server;

transmitting, by the client device, a metadata update request to the remote metadata access auditing server; and preventing access by the client device to the contents of the file by encrypting the file key until a metadata update confirmation is received from the remote metadata access auditing server; and decrypting the encrypted file key in response to receiving the metadata update confirmation from the remote metadata access auditing server.

21. The computer-implemented method of claim 20, wherein the remote metadata access auditing server is separate from the remote file access auditing server.

22. The computer-implemented method of claim 20, further comprising:

receiving, from the remote file access auditing server, one or more key request records in response to a request for key request records associated with a given time period, wherein each key request record includes an audit ID; and transmitting, to the remote metadata access auditing server, a request for metadata associated with an audit ID of a key request record of the one or more key request records.

* * * * *